US010587934B2

(12) United States Patent
Wang

(10) Patent No.: US 10,587,934 B2
(45) Date of Patent: Mar. 10, 2020

(54) VIRTUAL REALITY VIDEO SIGNALING IN DYNAMIC ADAPTIVE STREAMING OVER HTTP

(71) Applicant: QUALCOMM Incorporated, San Diego, CA (US)

(72) Inventor: Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 144 days.

(21) Appl. No.: 15/602,887

(22) Filed: May 23, 2017

(65) Prior Publication Data

US 2017/0347163 A1 Nov. 30, 2017

Related U.S. Application Data

(60) Provisional application No. 62/341,012, filed on May 24, 2016.

(51) Int. Cl.
*H04N 21/81* (2011.01)
*G06T 9/00* (2006.01)
(Continued)

(52) U.S. Cl.
CPC ........... *H04N 21/8146* (2013.01); *G06T 9/00* (2013.01); *H04L 65/608* (2013.01); *H04L 67/02* (2013.01);
(Continued)

(58) Field of Classification Search
CPC ....... G06F 3/013; H04L 67/38; H04N 21/238; H04N 21/2381; H04N 21/8146
(Continued)

(56) References Cited

U.S. PATENT DOCUMENTS 10,313,763 B2 * 6/2019 Lai ....................... H04N 7/0117
2003/0110297 A1 * 6/2003 Tabatabai .......... H04L 29/06027 709/246

(Continued)

FOREIGN PATENT DOCUMENTS

WO 2015197818 A1 12/2015
WO 2017202699 A1 11/2017

OTHER PUBLICATIONS

Hamza A, Hefeeda M. Adaptive streaming of interactive free viewpoint videos to heterogeneous clients. InProceedings of the 7th International Conference on Multimedia Systems May 10, 2016 (p. 10). ACM. (Year: 2016).*

(Continued)

*Primary Examiner* — James N Fiorillo
(74) *Attorney, Agent, or Firm* — Shumaker & Sieffert, P.A.

(57) ABSTRACT

A device for processing media data is configured to receive media data including virtual reality (VR) video data; determine, based at least in part on data signaled at an adaptation set level of a media presentation description for a media presentation, a projection mapping used in the media presentation; process segments of a video representation of the media presentation based on the projection mapping used in the media presentation. A device for processing media data is configured to generate media data that includes VR video data; include in the media data, data signaled at an adaptation set level of a media presentation description that identifies a projection mapping used in media presentation included in the media data; and send segments of a video representation of the media presentation based on the projection mapping used in the media presentation.

22 Claims, 11 Drawing Sheets

10
CONTENT PREPARATION DEVICE 20
AUDIO SOURCE 22
VIDEO SOURCE 24
AUDIO ENCODER 26
VIDEO ENCODER 28
ENCAPSULATION UNIT 30
OUTPUT INTERFACE 32
SERVER DEVICE 60
62
MULTIMEDIA CONTENT 64
MANIFEST FILE 66
REPRESENTATION 68A
REPRESENTATION 68N
REQUEST PROCESSING UNIT 70
NETWORK INTERFACE 72
CLIENT DEVICE 40
AUDIO OUTPUT 42
VIDEO OUTPUT 44
AUDIO DECODER 46
VIDEO DECODER 48
DECAPSULATION UNIT 50
RETRIEVAL UNIT 52
NETWORK INTERFACE 54
NETWORK 74

(51) Int. Cl.

| | |
|---|---|
| ***H04L 29/06*** | (2006.01) |
| ***H04L 29/08*** | (2006.01) |
| ***H04N 21/438*** | (2011.01) |
| ***H04N 21/44*** | (2011.01) |
| ***H04N 21/218*** | (2011.01) |
| ***H04N 21/2343*** | (2011.01) |
| ***H04N 21/262*** | (2011.01) |
| ***H04N 21/845*** | (2011.01) |
| ***H04N 19/597*** | (2014.01) |
| ***H04N 19/70*** | (2014.01) |

(52) U.S. Cl.

CPC .......... *H04N 19/597* (2014.11); *H04N 19/70* (2014.11); *H04N 21/21805* (2013.01); *H04N 21/23439* (2013.01); *H04N 21/234327* (2013.01); *H04N 21/26258* (2013.01); *H04N 21/4382* (2013.01); *H04N 21/44* (2013.01); *H04N 21/816* (2013.01); *H04N 21/8456* (2013.01)

(58) Field of Classification Search

USPC ............................ 709/217, 231; 348/42, 453

See application file for complete search history.

(56) References Cited

U.S. PATENT DOCUMENTS

| | | | | |
|---|---|---|---|---|
| 2012/0233345 | A1* | 9/2012 | Hannuksela | H04N 21/26258 709/231 |
| 2012/0290644 | A1* | 11/2012 | Gabin | H04L 65/4084 709/203 |
| 2013/0042100 | A1* | 2/2013 | Bouazizi | H04N 21/254 713/151 |
| 2013/0278633 | A1* | 10/2013 | Ahn | G06T 19/006 345/633 |
| 2014/0122739 | A1* | 5/2014 | Thang | H04L 65/4084 709/231 |
| 2014/0267581 | A1* | 9/2014 | Cronin | H04N 7/157 348/14.12 |
| 2014/0317307 | A1* | 10/2014 | Giladi | H04L 65/608 709/231 |
| 2015/0199498 | A1* | 7/2015 | Liu | G06F 21/10 713/167 |
| 2015/0304665 | A1* | 10/2015 | Hannuksela | H04N 19/70 375/240.02 |
| 2016/0080714 | A1* | 3/2016 | Tsukagoshi | H04N 19/70 348/453 |
| 2016/0191585 | A1* | 6/2016 | Ramamurthi | H04L 65/80 709/231 |
| 2017/0078447 | A1* | 3/2017 | Hancock | H04L 67/38 |
| 2017/0127152 | A1* | 5/2017 | Hirabayashi | H04N 21/238 |
| 2017/0237965 | A1* | 8/2017 | Wang | H04N 21/85406 348/42 |
| 2017/0272838 | A1* | 9/2017 | Glazer | H04N 21/8146 |
| 2017/0285738 | A1* | 10/2017 | Khalid | G06F 3/013 |
| 2017/0286993 | A1* | 10/2017 | Khalid | G06Q 30/0241 |
| 2019/0037278 | A1* | 1/2019 | Ahonen | H04N 21/47217 |
| 2019/0238612 | A1* | 8/2019 | Xie | H04L 65/80 |

OTHER PUBLICATIONS

Hamza A, Hefeeda M. Adaptive streaming of interactive free viewpoint videos to heterogeneous clients. InProceedings of the 7th International Conference on Multimedia Systems May 10, 2016 (p. 10). ACM. (Year: 2016) (Year: 2016).*

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.

ITU-T H.261, Line Transmission of Non-Telephone Signals, Video Codec for Audiovisual Services At px64 kbits, The International Telecommunication Union, Mar. 1993, 29 pp.

"Information Technolog—Dynamic adaptive streaming over HTTP (DASH)—Part 1: Media presentation description and segment formats", International Standard, ISO/IEC 23009-1:2014(E), May 15, 2015, 152 pp.

Fielding et al., "Hypertext Transfer Protocol—HTTP/1.1," Network Working Group, IETF, RFC 2616, Jun. 1999, 152 pp.

"Information Technology—High Efficiency Coding and Media Delivery in Heterogeneous Environments—Part 2: High Efficiency Video Coding", International Standard, ISO/IEC 23008-2, Dec. 1, 2013; 312 pp.

"Information Technology—Coding of Audio-Visual Object—Part 12: ISO base media file format", International Standard, ISO/IEC 14996-12, Oct. 15, 2008, 120 pp.

Singer, et al., "Information Technology—Coding of Audioi-Visual Objects—Part 15: AVC File Format", International Organization for Standardization, ISO/IEC JTC1/SC29/WG11, MPEG03/N5780, Coding of Moving Pictures and Audio, ISO/IEC 14496-15/FDIS, Aug. 11, 2003, 34 pp.

Paila et al., "FLUTE—File Delivery over Unidirectional Transport," Network Working Group, RFC 6726, Nov. 2012, Retrieved from http://tools.ietf.org/html/rfc6726, 46 pp.

"Information Technology—Coding of Audio-Visual Objects—Part 14: MP4 file format", International Standard, ISO/IEC 14496-14, Nov. 15, 2003, 18 pp.

"3rd Generation Partnership Project; Technical Specification Group Services and System Aspects; Transparent end-to-end packet switched streaming service (PSS); 3GPP file format (3GP) (Release 12)", 3GPP TS 26.244 V. 12.2.0, Dec. 2013, 61 pp.

International Preliminary Report on Patentability from International Application No. PCT/US2017/034261, dated Aug. 7, 2018, 8 pp.

"Information Technology—Coding of Audio-Visual Object—Part 12: ISO base media file format", International Standard ISO/IEC 14496-12, Oct. 15, 2008, 120 Pages.

Choi B., et al., "Proposed Text for Omnidirectional Media Application Format," 114. MPEG Meeting; Feb. 22, 2016-Feb. 26, 2016; San Diego; (Motion Picture Expert Group or ISO/IEC JTC1/SC29/WG11), No. m37837, Feb. 28, 2016 (Feb. 20, 2016), XP030066203, 13 Pages.

Hannuksela M.M., et al., "DASH/OMAF: Virtual Reality Video Descriptor," 115th MPEG Meeting, ISO/IEC JTC1/SC29/WG11 MPEG2016/M38613, May 25, 2016, XP030066965, 5 pages.

International Search Report and Written Opinion—PCT/US2017/034261—ISA/EPO—dated Aug. 11, 2017.

"ISO/IEC 23009-1—Information Technology—Dynamic Adaptive Streaming Over HTTP (DASH)—Part 1: Media Presentation Description and Segment Formats," Apr. 1, 2012, XP055112819, Retrieved from the Internet: URL:https://www.iso.org/standard/65274.html [retrieved on Apr. 8, 2014], 83 page.

"Requirements and Use Cases for Omnidirectional Media Application Format," 113th MPEG Meeting, ISO/IEC JTC1/SC29/WG11 N15731, Jan. 5, 2016, XP030022414, 4 pages.

Truong T., "VR Signaling Metadata for DASH," 117th MPEG Meeting, ISO/IEC JTC1/SC29/WG11 MPEG2017/M39885, Jan. 11, 2017, XP030068230, 4 pages.

Response to Written Opinion dated Aug. 11, 2017, from International Application No. PCT/US2017/034261, filed on Jan. 15, 2018, 17 pp.

(56) References Cited

OTHER PUBLICATIONS

Second Written Opinion from International Application No. PCT/US2017/034261, dated Apr. 20, 2018, 5 pp.

* cited by examiner

VIRTUAL REALITY VIDEO SIGNALING IN DYNAMIC ADAPTIVE STREAMING OVER HTTP

This Application claims the benefit of U.S. Provisional Patent Application 62/341,012 filed 24 May 2016, the entire content of which is hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265—High Efficiency Video Coding (HEVC) and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as the HEVC file format.

SUMMARY

In general, this disclosure describes techniques related to virtual reality (VR). More specifically, this disclosure describes techniques for signaling of VR video in dynamic adaptive streaming over HTTP (DASH).

According to one example of this disclosure, a method for processing media data includes receiving the media data, wherein the media data comprises virtual reality (VR) video data; determining, based at least in part on data signaled at an adaptation set level of a media presentation description for a media presentation, a projection mapping used in the media presentation; and processing segments of a video representation of the media presentation based on the projection mapping used in the media presentation According to another example of this disclosure, a device for processing media data includes a memory configured to store the media data and one or more processors configured to receive the media data, wherein the media data comprises virtual reality (VR) video data; determine, based at least in part on data signaled at an adaptation set level of a media presentation description for a media presentation, a projection mapping used in the media presentation; and process segments of a video representation of the media presentation based on the projection mapping used in the media presentation.

According to another example of this disclosure, a method of processing media data include generating media data, wherein the media data includes virtual reality (VR) video data; including in the media data, data signaled at an adaptation set level of a media presentation description that identifies a projection mapping used in a media presentation included in the media data; and processing segments of a video representation of the media presentation based on the projection mapping used in the media presentation.

According to another example of this disclosure, a device for processing media data includes a memory configured to store the media data and one or more processors configured to generate media data, wherein the media data includes virtual reality (VR) video data; include in the media data, data signaled at an adaptation set level of a media presentation description that identifies a projection mapping used in a media presentation included in the media data; and send segments of a video representation of the media presentation based on the projection mapping used in the media presentation.

The details of one or more examples are set forth in the accompanying drawings and the description below. Other features, objects, and advantages will be apparent from the description, drawings, and from the claims.

DETAILED DESCRIPTION

Figure 1:
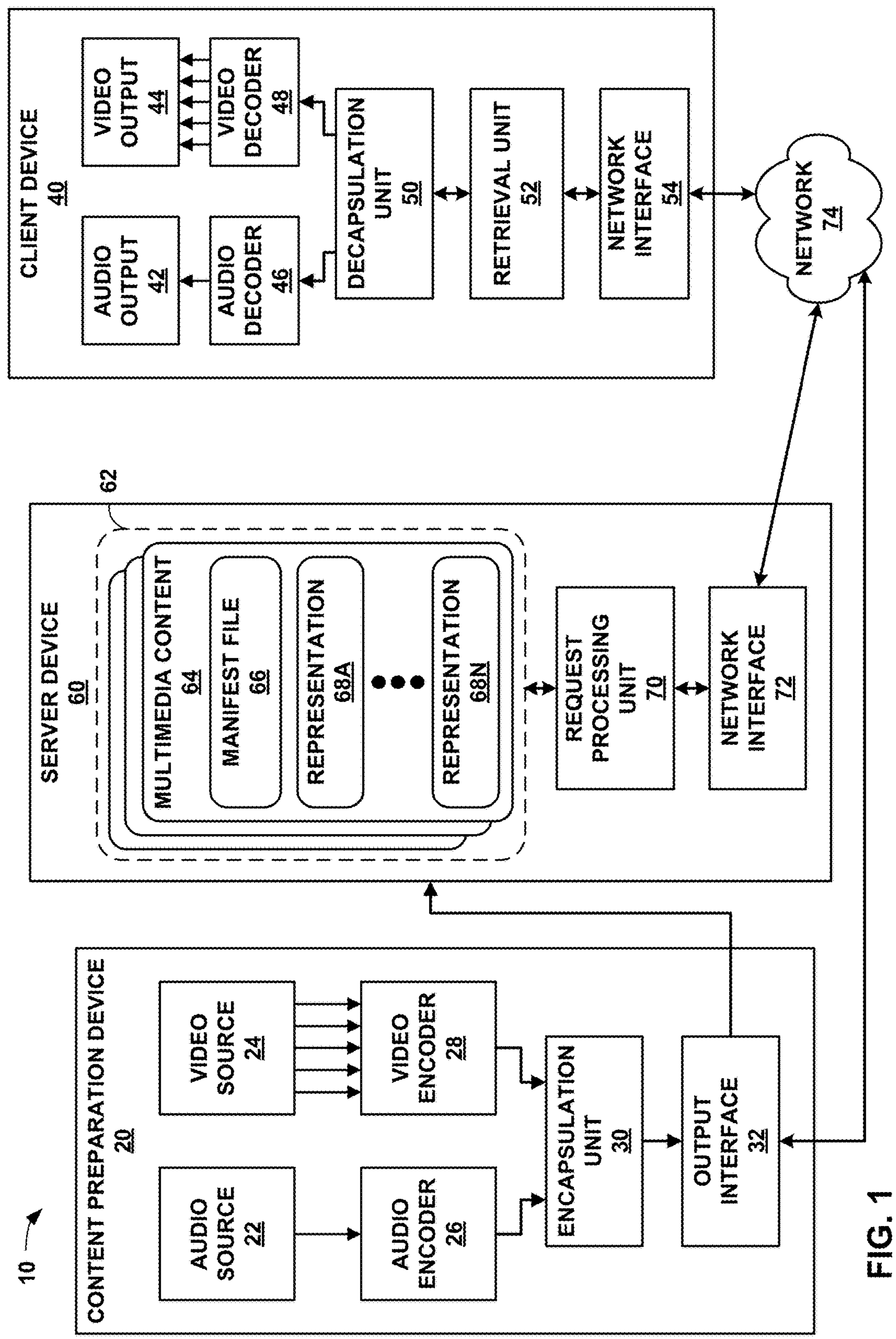
FIG. 1 is a block diagram illustrating an example system that implements techniques for streaming media data over a network.

In general, this disclosure describes techniques related to virtual reality (VR). More specifically, this disclosure describes techniques for signaling of VR video in dynamic adaptive streaming over HTTP (DASH). A version of DASH is specified in ISO/IEC 23009-1. The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. ISO/IEC 23009-1 defines a media presentation as a collection of data that establishes a bounded or unbounded presentation of media content. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. ISO/IEC 23009-1 defines an interval of the Media Presentation, where a contiguous sequence of all Periods constitutes the Media Presentation. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. ISO/IEC 23009-1 defines a representation as a collection and encapsulation of one or more media streams in a delivery format and associated with descriptive metadata and defines an adaptation set as a set of interchangeable encoded versions of one or several media content components. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI. ISO/IEC 23009-1 defines a segment as a unit of data associated with an HTTP-URL and optionally a byte range that are specified by an MPD and defines an initialization segment as a s segment containing metadata that is necessary to present the media streams encapsulated in Media Segments. ISO/IEC 23009-1 defines a media segment as a segment that complies with media format in use and enables playback when combined with zero or more preceding segments, and an initialization Segment (if any).

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

In addition, encapsulation unit 30 may form a manifest file, such as a media presentation descriptor (MPD) that describes characteristics of the representations. Encapsulation unit 30 may format the MPD according to extensible markup language (XML). Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations

68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC), multiview extension (i.e., multiview high efficiency video coding, MV-HEVC), and 3D extension (i.e., 3D high efficiency video coding, 3D-HEVC).

File formats and file format standards will now be briefly discussed. File format standards include ISO base media file format (ISOBMFF, ISO/IEC 14496-12, hereinafter, "ISO/IEC 14996-12"), and other file format standards derived from the ISOBMFF, including MPEG-4 file format (ISO/IEC 14496-15), 3GPP file format (3GPP TS 26.244), and ISO/IEC 14496-15 that contains the file formats for AVC (ISO/IEC 14496-15, hereinafter "ISO/IEC 14996-15") and its extensions as well as the file formats for HEVC and its extensions. Thus, ISO/IEC 14496-12 specifies the ISO base media file format. Other documents extend the ISO base media file format for specific applications. For instance, ISO/IEC 14496-15 describes the carriage of NAL unit structured video in the ISO base media file format. H.264/AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units. Thus, section 8 of ISO/IEC 14496-15 is said to describe the HEVC file format. After the $114^{th}$ MPEG meeting, based on comments received from several national bodies, a disposition document was prepared that contains some changes to the ISO/IEC 14496-15 that will be applied to the new version of the ISO/IEC 14496-15 draft specification. This disposition document is referred to as "MPEG output document N15297."

ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. Thus, although originally designed for storage, the ISOBMFF has proven valuable for streaming, e.g., for progressive download or DASH. For streaming purposes, movie fragments defined in ISOBMFF can be used. In addition to continuous media, such as audio and video, static media, such as images, as well as metadata can be stored in a file conforming to ISOBMFF.

Figure 9:
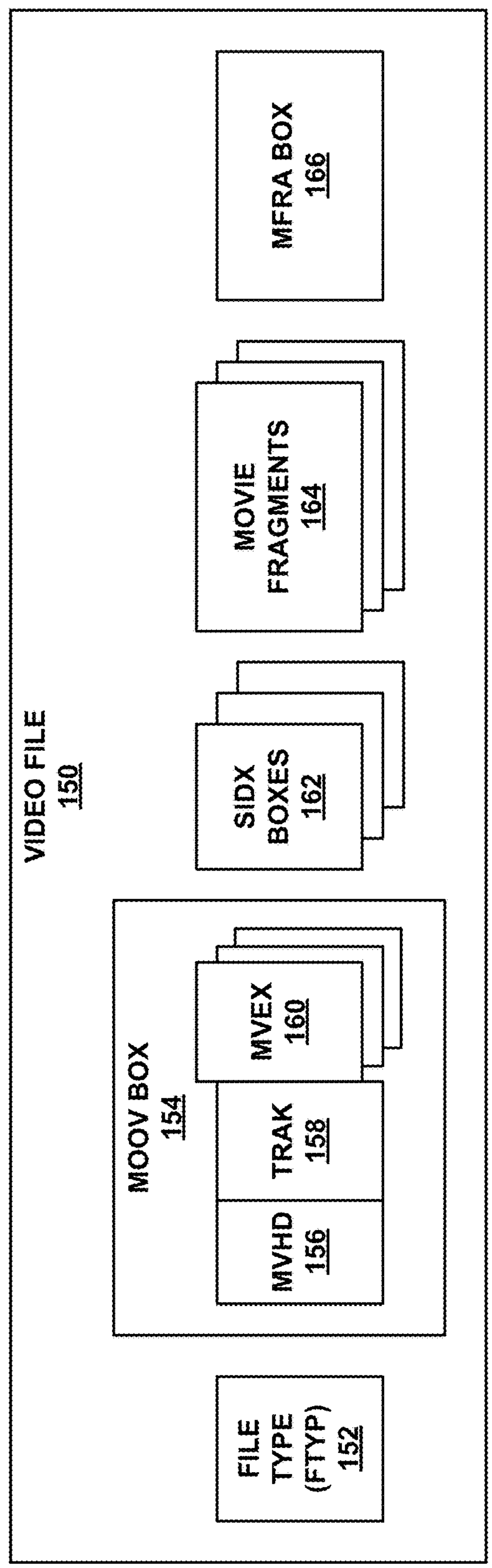
FIG. 9 is a block diagram illustrating elements of an example video file.

A file conforming to the HEVC file format may comprise a series of objects, called boxes. A box may be an object-oriented building block defined by a unique type identifier and length. A box is the elementary syntax structure in the ISOBMFF, including a four-character coded box type, the byte count of the box, and the payload. In other words, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file consists of a sequence of boxes, and boxes may contain other boxes. For instance, the payload of a box may include one or more additional boxes. FIG. 9, described in detail elsewhere in this disclosure, shows example boxes within a file, in accordance with one or more techniques of this disclosure.

A file conforming to ISOBMFF may include various types of boxes. For example, a file conforming to ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises or consists of a sequence of samples, such as audio or video access units.

ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data used for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF. The Sample Table box contains a sample table that contains all the time and data indexing of the media samples in a track. Using the tables in the Sample Table box, it may be possible to locate samples in time, determine their type (e.g. I-frame or not), and determine their size, container, and offset into that container.

For example, a Sync Sample box ("stss") is a box within a Sample Table box. The Sync Sample box is used to list the random access samples of the track. This disclosure may refer to a sample listed by the Sync Sample box as a sync sample. In another example, a sample grouping mechanism enables mapping of samples according to a four-character grouping type into groups of samples sharing the same property specified as a sample group description entry in the file. Several grouping types have been specified in ISOBMFF.

The ISOBMFF specification specifies six types of Stream Access Points (SAPs) for use with DASH. The first two SAP types (types 1 and 2), correspond to IDR pictures in H.264/AVC and HEVC. The third SAP type (type 3) corresponds to open-GOP random access points hence BLA or CRA pictures in HEVC. The fourth SAP type (type 4) corresponds to GDR random access points.

A Movie Fragment box is a top-level box. Each Movie Fragment box provides information that would have previously been in the Movie box. A Movie Fragment box may contain one or more track fragment ("traf") boxes. Within the Movie Fragment there is a set of track fragments, zero or more per track. The track fragments in turn contain zero or more track runs, each of which documents a contiguous run of samples for that track. For instance, each track run may contain samples of pictures that are contiguous in a certain order, such as decoding order. A track fragment box is defined in the 14996-12 specification and comprises metadata for one or more track fragments. For instance, a track fragment box may include a track fragment header box indicating a track ID, a base data offset, a sample description index, a default sample duration, a default sample size, and default sample flags. A track fragment box may include one or more track fragment run boxes, each documenting a contiguous set of samples for a track. For instance, a track fragment box may include syntax elements indicating a sample count, a data offset, sample flags, a sample duration, a sample size, sample composition time offset, and so on. Within these structures, many fields are optional and can be defaulted.

A sample table box may include one or more SampleToGroup boxes and one or more sample group description boxes (i.e., SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). In some instances, in this disclosure, an element of a box may also be referred to as a syntax element. The grouping type element may be an integer that identifies a type (i.e., a criterion used to form the sample groups) of a sample grouping. Furthermore, a SampleToGroup box may include one or more entries (i.e., sample group entries). Each sample group entry in a SampleToGroup box may be associated with a different, non-overlapping series of consecutive samples in the track. Each sample group entry may indicate a sample count element (e.g., sample_count) and a group description index element (e.g., group_description_index). The sample count element of a sample group entry may indicate a number of samples associated with the sample group entry. In other words, the sample count element of the sample group entry may be an integer that gives the number of consecutive samples with the same sample group descriptor. The group description index element may identify, within a SampleGroupDescription box, a group description entry that contains a description of the samples associated with the sample group entry. The group description index elements of multiple sample group entries may identify the same SampleGroupDescription box.

Dynamic adaptive streaming over HTTP (DASH), specified in ISO/IEC 23009-1, is a standard for HTTP (adaptive) streaming applications. DASH mainly specifies the format of the media presentation description (MPD), also known as manifest, and the media segment format. The MPD describes the media available on the server and lets the DASH client to autonomously download the media version at the media time it is interested in.

DASH is based on a hierarchical data model. A presentation is described by an MPD document that describes the sequence of periods in time that make up the media presentation. A period typically represents a media content period during which a consistent set of encoded versions of the media content is available, e.g., the set of available bitrates, languages, captions, subtitles etc. does not change during a Period.

Within a period, material is arranged into adaptation sets. An adaptation set represents a set of interchangeable encoded versions of one or several media content components. For example, there may be one adaptation set for the main video component and a separate adaptation set for the main audio component. Other available material, such as captions or audio descriptions, may each have a separate adaptation set. Material may also be provided in multiplexed form, in which case interchangeable versions of the multiplex may be described as a single adaptation set, for example an adaptation set containing both the main audio and main video for a period. Each of the multiplexed components may be described individually by a media content component description.

An adaptation set contains a set of representations. A representation describes a deliverable encoded version of one or several media content components. A representation includes one or more media streams (one for each media content component in the multiplex). Any single representation within an adaptation set is sufficient to render the contained media content components. By collecting different representations in one adaptation set, the media presentation author expresses that the representations represent perceptually equivalent content. Typically, this means, that clients may switch dynamically from representation to representation within an adaptation set in order to adapt to network conditions or other factors. Switching refers to the presentation of decoded data up to a certain time t, and presentation of decoded data of another representation from time t onwards. If representations are included in one Adaptation Set, and the client switches properly, the media presentation is expected to be perceived seamless across the switch. Clients may ignore representations that rely on codecs or other rendering technologies they do not support or that are otherwise unsuitable. Within a representation, the content may be divided in time into segments for proper accessibility and delivery. In order to access a segment, a URL is provided for each segment. Consequently, a segment is the largest unit of data that can be retrieved with a single HTTP request.

A typical procedure for DASH based HTTP streaming includes the following steps:

1) A client obtains the MPD of a streaming content, e.g. a movie. The MPD includes information on different alternative representations, e.g., bit rate, video resolution, frame rate, audio language, of the streaming content, as well as the URLs of the HTTP resources (the initialization segment and the media segments).
2) Based on information in the MPD and the client's local information, e.g., network bandwidth, decoding/display capabilities and user preference, the client requests the desired representation(s), one segment (or a part thereof) at a time.
3) When the client detects a network bandwidth change, it requests segments of a different representation with a better-matching bitrate, ideally starting from a segment that starts with a random access point.

During an HTTP streaming "session," to respond to the user request to seek backward to a past position or forward to a future position, the client requests past or future segments starting from a segment that is close to the desired position and that ideally starts with a random access point. The user may also request to fast-forward the content, which may be realized by requesting data sufficiently for decoding only the intra-coded video pictures or only a temporal subset of the video stream.

Virtual reality (VR) is the ability to be virtually present in a non-physical world created by the rendering of natural and/or synthetic image and sound correlated by the movements of the immersed user allowing to interact with that world. With the recent progress made in rendering devices, such as head mounted displays (HMD), and VR video (often also referred to as 360-degree video) creation, a significant quality of experience can be offered. VR applications including gaming, training, education, sports video, online shopping, adult entrainment, and so on.

A typical VR system may include the following components and steps:

a. A camera set, which typically consists of multiple individual cameras pointing to different directions and ideally collectively covering all viewpoints around the camera set.
b. Image stitching, where video pictures taken by the multiple individual cameras are synchronized in the time domain and stitched in the space domain, to be a spherical video, but mapped to a rectangular format, such as equi-rectangular (like a world map) or cube map.
c. The video in the mapped rectangular format is encoded/compressed using a video codec, e.g., H.265/HEVC or H.264/AVC.
d. The compressed video bitstream(s) may be stored and/or encapsulated in a media format and transmitted (possibly only the subset covering only the area being seen by a user) through a network to a receiver.
e. The receiver receives the video bitstream(s) or part thereof, possibly encapsulated in a format, and sends the decoded video signal or part thereof to a rendering device.
f. The rendering device can be e.g., an HMD, which can track head movement and even eye move moment and rendering the corresponding part of the video such that an immersive experience is delivered to the user.

A distinct feature of VR video compared to normal video is that, in VR typically only a subset of the entire video region represented by the video pictures, corresponding to the current field of view (FOV), i.e., the area currently being seen by the user, is displayed, while in normal video applications typically the entire video region is displayed. FOV is sometimes also referred to as viewport. This feature may be utilized to improve the performance of VR video systems, e.g., by using viewport dependent projection mapping or viewport dependent video coding. The performance improvement can be either or both of lower transmission bandwidth and lower decoding complexity compared to conventional VR video systems under the same resolution/quality of the video part presented to the user.

Viewport dependent projection mapping may also be referred to as asymmetric projection mapping. One example is a sub-sampled cube-map. A typical cube-map consists of six equal-sized faces. In one example of a sub-sampled cube-map, one of the faces can be kept unchanged, while the face on the opposite side can be sub-sampled or down-scaled to a smaller size located at the center area of the original face shape, and other faces are geometrically scaled accordingly (still keeping the six faces). The extreme is to down-scale the face on the opposite side to be a single point, and thus the cube becomes a pyramid. In another example of sub-sampled cube-map, some faces are proportionally down-sized e.g., by a 2×2 ratio (i.e., 2:1 in each direction parallel to an edge of the face).

Such down-sized scaling can also be applied to different regions for other projection mappings such as equi-rectangular. One example is to down-size both the upper and bottom regions (i.e., the poles).

Viewport dependent video coding may also be referred to as viewport dependent partial video decoding, as the key is to enable decoding only partially the entire encoded video region to provide sufficient information for display of the current FOV or viewport.

Conventionally, a VR video is represented with an equi-rectangular or cube-map protection mapping. The video pictures are encoded as a single-layer bitstream using temporal inter prediction (TIP), the entire coded bitstream is stored at a server, if needed, transmitted to the receiver side, fully decoded by the decoder, and the region of the decoded picture corresponding to the current viewport is rendered to the user.

Figure 2:
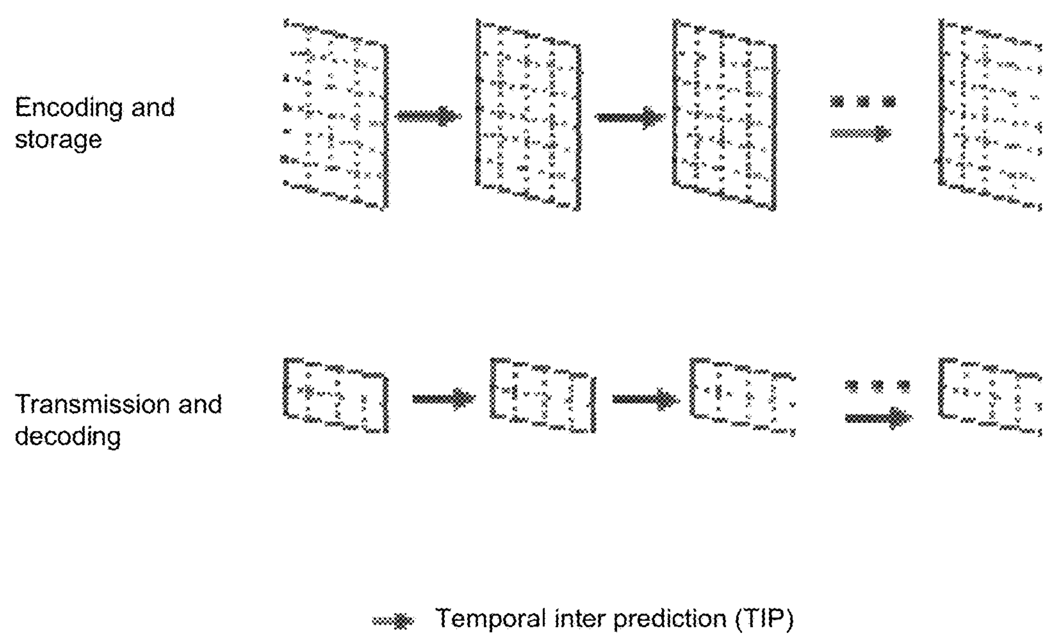
FIG. 2 is a conceptual diagram illustrating an example of tile based virtual reality (VR) video partial decoding.

The VR video pictures can be coded using motion-constrained tiles such that each potential region covering a viewport can be independently decoded from other regions across time. For a particular current viewport, the minimum set of tiles that cover the viewport is sent to the client, decoded, and rendered. This method is referred to as Simple Tile based Partial Decoding (STPD), and is depicted by FIG. 2.

A problem of this approach is that when the user turns his or her head quickly to a new viewport that is not covered (entirely or partially) by the currently being sent tiles, nothing in the new area (covered by the new viewport but not the old viewport) can be seen before the tiles covering the new viewport arrive (and the data is sufficiently buffered according to the buffering timeline). Therefore, this method can only work if the network round trip time is extremely low, e.g., at a magnitude of 10 ms, which is not feasible or is at least a big challenge today or in the near future.

Figure 3:
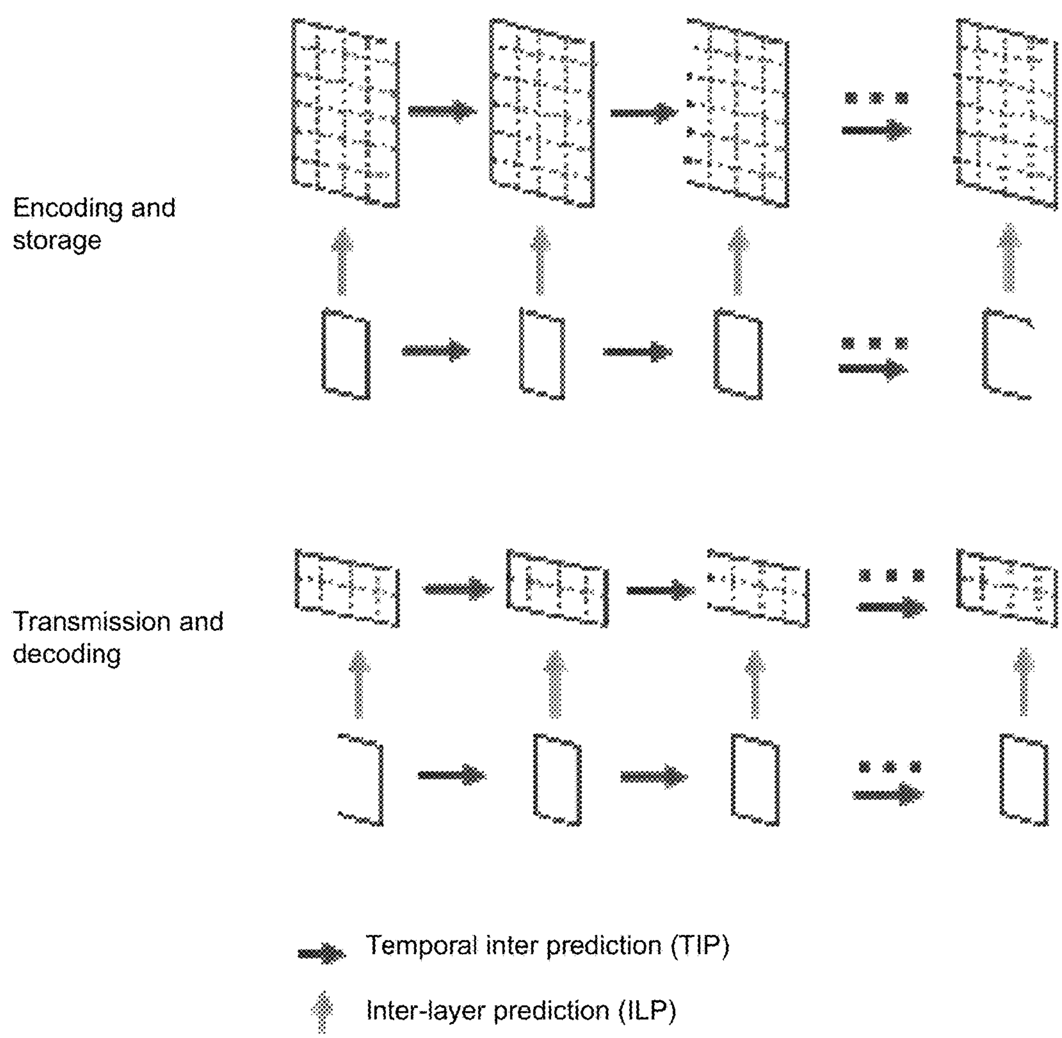
FIG. 3 is a conceptual diagram illustrating a first scalable coding VR video partial decoding.

Two ScaLable coding based Partial Decoding (SLPD) schemes, referred to as SLPD#1 and SLPD#2, are presented in this section._In SLDP#1, as depicted by FIG. 3, the VR video is scalable-coded using SHVC (or another type of scalable video coding) spatial scalability with multiple resolutions. The bitstream of the lowest resolution video, i.e., the base layer (BL) is always fully sent, such that at any time for any viewport at least the lowest resolution video is available for rendering. The lowest resolution video does not need to be coded using tiles at all, although it would also work if it is coded using tiles or motion-constrained tiles.

The enhancement layers (ELs) are coded using motion-constrained tiles such that each potential region covering a viewport can be independently decoded from other regions across time, with inter-layer prediction (ILP) enabled. For a particular current viewport, the minimum set of tiles that cover the viewport is sent to the client, decoded, and rendered. From the storage point of view, the full streams of all the resolutions/layers need to be stored.

When more than two layers are coded, tiles covering different viewports can be chosen from different resolutions. For the current viewport, the tiles are chosen from the highest resolution; for viewports neighboring to the current viewport, tiles are chosen from the second highest resolution; and so on.

Figure 4:
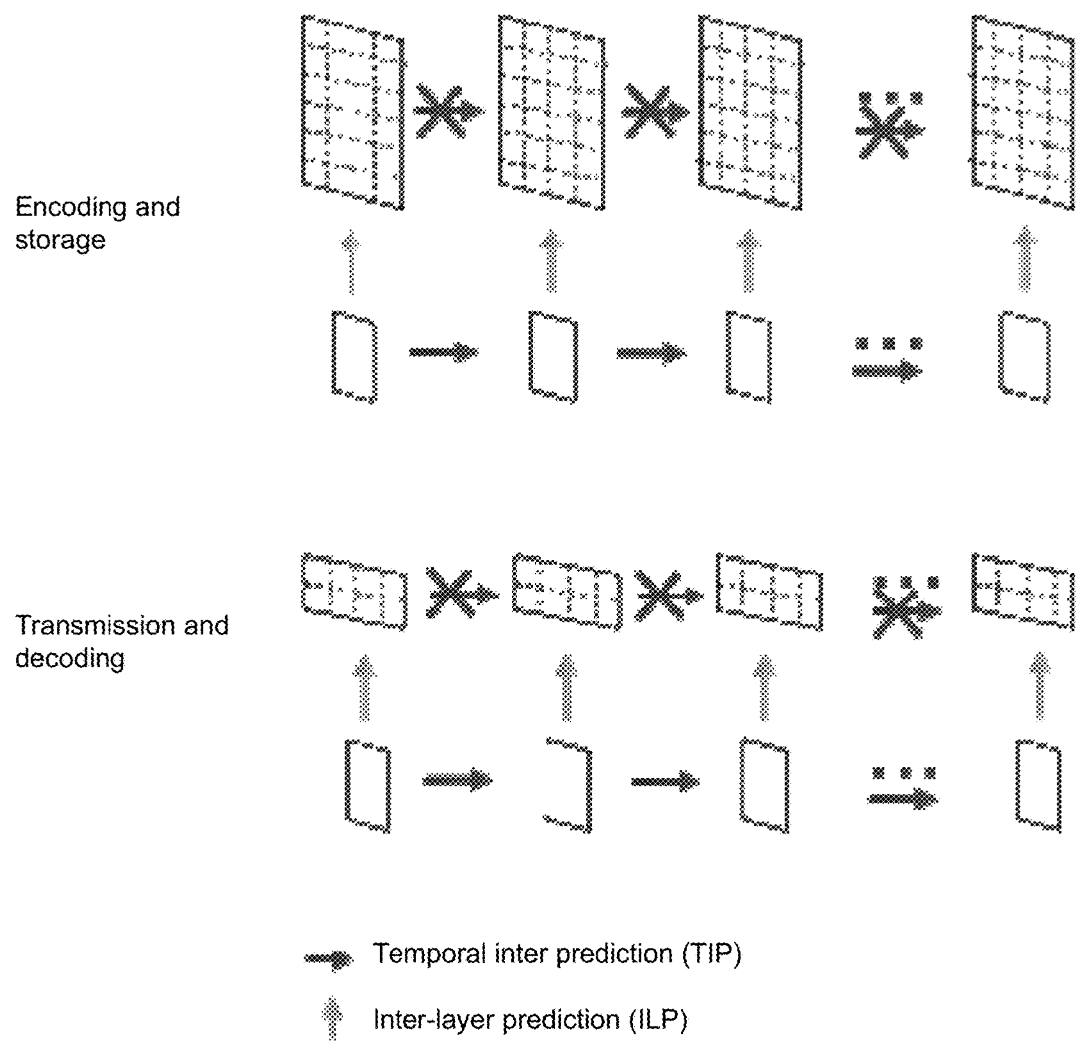
FIG. 4 is a conceptual diagram illustrating a second scalable coding VR video partial decoding.

In SLDP#2, as depicted by FIG. 4, the VR video is also scalable-coded using SHVC spatial scalability with multiple resolutions. The BL is coded the same as in SLPD#1, while the ELs are coded similarly as in SLPD#1 but with temporal inter prediction (TIP) disabled.

Figure 5:
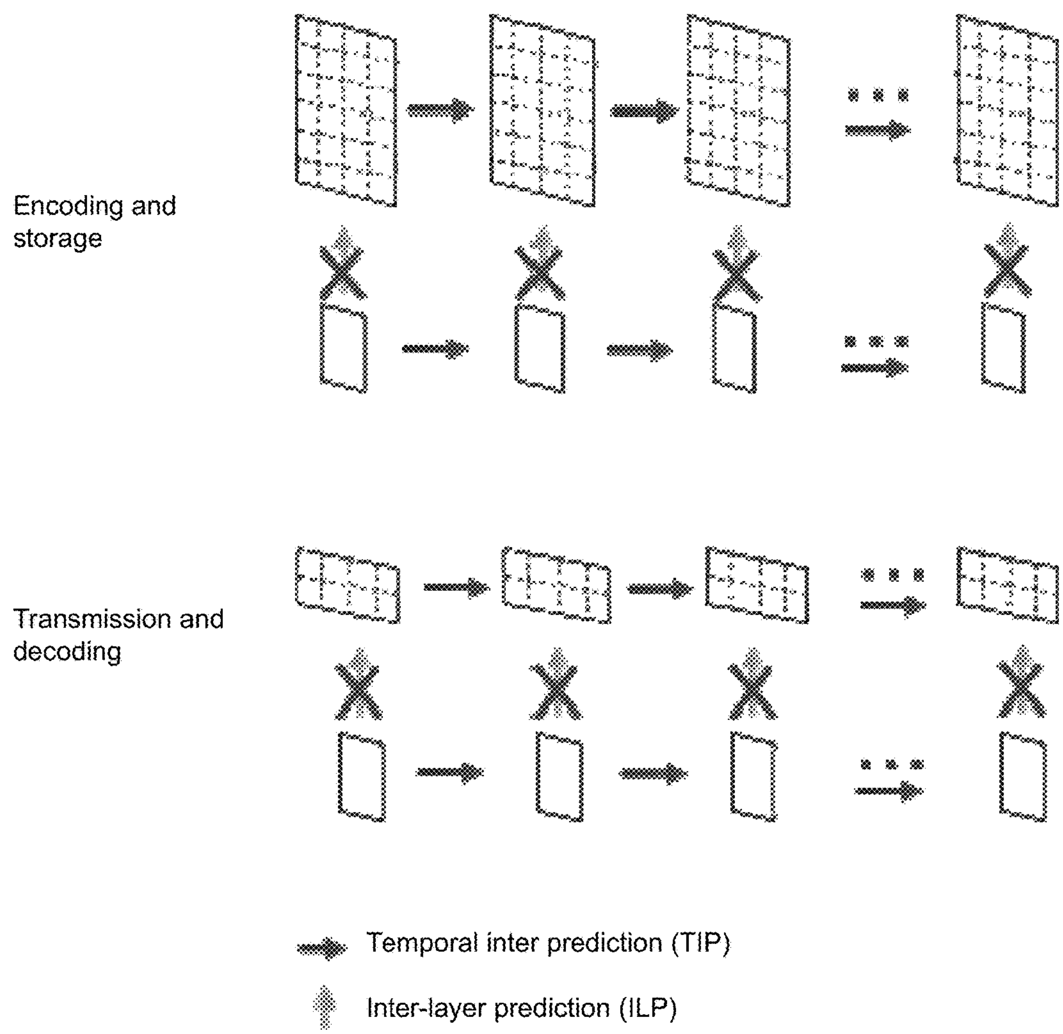
FIG. 5 is a conceptual diagram illustrating a first simulcast coding based VR video partial decoding.
Figure 6:
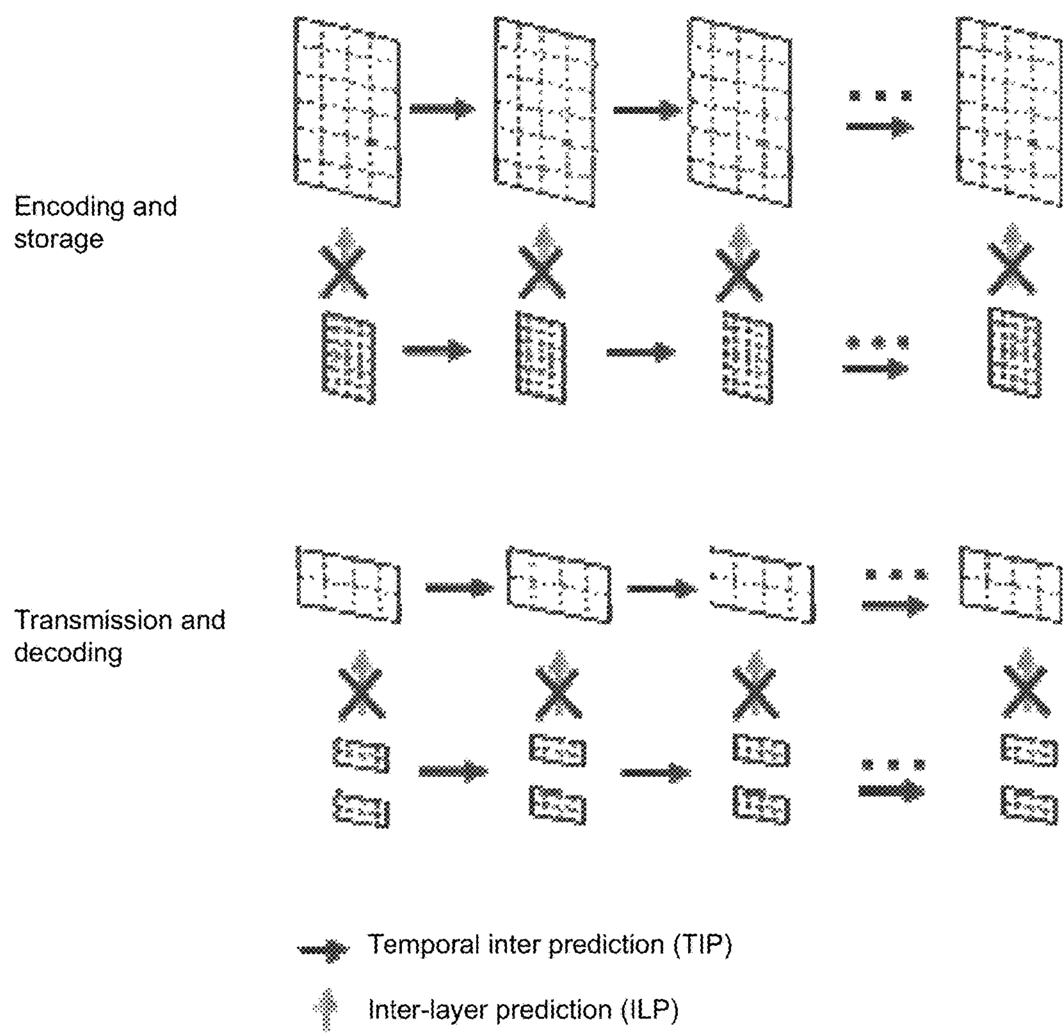
FIG. 6 is a conceptual diagram illustrating a second simulcast coding based VR video partial decoding.

Two SiMulcast coding based Partial Decoding (SMPD) schemes, referred to as SMPD#1 and SMPD#2, are presented in this section. SMPD#1 is depicted by FIG. 5. This method is the same as SLPD#1 except that inter-layer prediction is not used. In other words, except the lowest resolution, all other resolutions are coded the same way as in STPD. SMPD#2 is depicted by FIG. 6. There are two differences between SMPD#2 and SMPD#1: In SMPD#2, the lowest resolution is also coded using motion-constrained tiles same as other resolutions. When SMPD#2 is used, the lowest resolution is also not fully sent, but only the tiles that cover the viewport that is geometrically the most distant from the current viewport and any other viewports not covered by sent tiles from other resolutions.

As of today, there lacks a design of supporting VR signaling in DASH. For example, for a VR streaming system based on DASH to work well, this disclosure proposes a signaling to indicate that either all video representations or some video representations contain VR video instead of normal video (i.e., traditionally, non-VR video). In one example, the signaling mechanism is backward compatible in the sense that legacy DASH clients that do not support VR video rendering do not try to consume a VR video representation. For another example, the used projection mapping, which is a fundamental part of VR video, may be efficiently signaled. Furthermore, when a motion-constrained tiles based viewport dependent VR video coding scheme is in use, some signaling at DASH may be used to enable DASH clients to select a particular representation both initially (based on client capability and user preference) and during a streaming session for stream adaptation (to the changing network conditions etc.).

This disclosure describes several techniques for signaling of VR video in DASH. One or more of these techniques may be applied independently, or in combination with others. The techniques may be described with respect to various data being signaled at different levels. As introduced above, from highest to lowest, such levels include, a document level, an MPD level, a period level, an adaptation set level, and a representation level. Each level includes data structures with unique semantics (e.g., unique combinations of elements and attributes). In this context, an attribute may refer to a single value, while an element refers to a collection of one or more attributes. An element may also include additional elements.

A signaling on an MPD level (e.g., through an MPD-level element or attribute) is proposed to indicate one or more of the following:

a. All the video representations of the media presentation contain VR video. For this case to work in a backward compatible way, a new DASH profile exclusively for VR video is defined. For a media presentation conforming to this profile, all the video representations of the media presentation shall contain VR video. This way, legacy DASH clients can be configured to not try to access the media presentation at all.

b. There is at least one of the video representations of the media presentation contains VR video and there is at least one of the video representations of the media presentation contains normal video. In this case, an existing DASH profile that allows normal video representations may be used. However, each video adaptation set for which all representations contain VR video or each representation that contains VR video should then be signalled by a new DASH profile or something other indication to prohibit legacy DASH clients to try to use any video representation that contains VR video.

For example, a device, such as content preparation device 20, may signal data, in a MPD data structure of a media presentation, that indicates that at least one video representation in the media presentation contains VR video, and the device may send segments of the at least one video representation in the media presentation. A device, such as client device 40 or server device 60, may determine, based at least in part on data signaled in a MPD data structure of a media presentation, that at least one video representation in the media presentation contains VR video and retrieve segments of the at least one video representation in the media presentation. To retrieve the segments, the device may, based at least in part on the device being configured to decode VR video, retrieve the segments of the at least one video representation in the media presentation. A device such as client device 40 may decode the at least one video representation in the media presentation. A device such as server device 60 may transmit the segments of the at least one video representation to another device, such as client device 40. In some examples, to determine that at least one video representation in the media presentation contains VR video, the device may determine, based on the data signaled in the MPD data structure, that all video representations in the media presentation contain VR video.

The data may, for example, be an MPD-level element or MPD-level attribute. The media presentation may include a video adaptation set containing one or more video representations of the media presentation. The video adaptation set may conform to a particular DASH profile for VR video, where all video representations in media presentations conforming to the particular DASH profile contain VR video. At least one video representation in the media presentation may also contain non-VR video.

The used projection mapping may be signaled on both a period level (e.g., through a period-level element or attribute) and an adaptation set level (e.g., through an adaptation-set-level element or attribute), but not on a representation level to discourage representation switching for stream adaptation between VR video representations and non-VR video representations.

a. When the period level signalling is present, the signalling on adaptation set level is optional, and in this case if the signalling is also present for an adaptation set, it shall not contradict with the period level signalling.

b. When the period level signalling is not present, then the adaptation set level signalling is mandatory (i.e., must be present).

For example, a device, such as content preparation device 20, may send data in at least one of a period level of a media presentation description or an adaptation set level of the media presentation description, and the data may indicate a projection mapping used in the media presentation. The device may send segments of a video representation of the media presentation. A device, such as client device 40 or server device 60, may retrieve media data by determining, based at least on part on data signaled in at least one of a period level of a media presentation description or an adaptation set level of the media presentation description, a projection mapping used in the media presentation and, based on the determination, retrieving segments of a video representation of the media presentation. The device may also determine, based at least in part on the projection mapping used in the media presentation, whether to retrieve the segments of the video representation. The device may also determine, based at least in part on the projection mapping used in the media presentation, how to decode the segments of the video representation. Data signaling the projection mapping is not signaled at a representation level of the media presentation.

In some examples, when data signaling the projection mapping is present at the period level of the media presentation, the signaling of the projection mapping at the adaptation set level of the media presentation may be optional. In some examples, when data signaling the projection mapping is present at the adaptation set level of the media presentation, signaling the projection mapping at the period level of the media presentation may be mandatory. Data signaling the projection mapping may not be signaled at a representation level of the media presentation.

An adaptation set level signalling (e.g., through an adaptation-set-level element or attribute) is used to indicate whether a motion-constrained tiles based viewport dependent VR video coding scheme is in use, and if yes, which one. For example, it may be specified that one of the three approaches STPD, SLPD#1, and SMPD#2 as described in Section 2.5.2 may be used, and an attribute is used to indicate which of these three is in use, e.g., the value 1, 2, or 3 indicates that STPD, SLPD#1, or SMPD#2, respectively, is used.

For example, a device, such as content preparation device 20, may send data, at an adaptation set level of a media presentation description for a media presentation, that indicates a motion-constrained tiles based viewport dependent VR video coding scheme is in use in the media presentation and send segments of the media presentation. The data may be first data, the device may also send second data, signaled at the adaptation set level of the media presentation, that indicates which motion-constrained tiles based viewport dependent VR coding scheme is in use in the media presentation. A device, such as client device 40 or server device 60, may determine, based on first data signaled at an adaptation set level of a media presentation description for a media presentation, whether a motion-constrained tiles based viewport dependent VR video coding scheme is in use in the media presentation, and the device may retrieve segments of the media presentation. Responsive to determining that the motion-constrained tiles based viewport dependent VR coding scheme is in use in the media presentation, the device may determine, based on second data signaled at the adaptation set level of the media presentation, which motion-constrained tiles based viewport dependent VR coding scheme is in use in the media presentation.

In accordance with a first motion-constrained tiles based viewport dependent VR coding scheme, the device may encode or decode VR video pictures using motion-constrained tiles such that each potential region covering a viewport is independently decodable from other regions across time. In accordance with a second motion-constrained tile based viewport dependent VR coding scheme (1) VR video may be scalable-coded using scalable video coding spatial scalability with multiple resolutions, (2) a base layer may be fully sent, such that at any time for any viewport at least the lowest resolution video is available for rendering, (3) enhancement layers (ELs) are coded using motion-constrained tiles such that each potential region covering a viewport can be independently decoded from other regions across time, with inter-layer prediction enabled, and (4) temporal inter prediction is enabled in the base layer and Els. In accordance with a third motion-constrained tile based viewport dependent VR coding scheme, (1) VR video may be scalable-coded using scalable video coding spatial scalability with multiple resolutions, (2) a base layer may be fully sent, such that at any time for any viewport at least the lowest resolution video is available for rendering, (3) ELs may be coded using motion-constrained tiles such that each potential region covering a viewport can be independently decoded from other regions across time, with inter-layer prediction enabled, and (4) temporal inter prediction may be enabled in the base layer but disabled in the ELs. The second data signaled at the adaptation set level of the media presentation may indicates which of the first, second, or third motion-constrained tile based viewport dependent VR coding scheme is in use in the media presentation.

The signalling of a tile based viewport dependent partial VR video encoding and decoding scheme on the file format level can use the tiled storage of HEVC and layered HEVC (L-HEVC) in clause 10 of ISO/IEC 14496-15. In some examples, the tile tracks are used, each carrying one motion-constrained tile or tile region, to avoid the need of using lots of byte ranges for requests of the tiles covering a viewport from a particular DASH representation (corresponding to one track) when the tile region sample group mapping is used.

For example, a device, such as content preparation device 20, may send data, stored at a file format level of a file containing a media presentation, that indicates a tile based viewport dependent VR video encoding and decoding scheme and send segments of the media presentation. A device, such as client device 40 or server device 60, may determine, based on data stored at a file format level of a file containing a media presentation, a tile based viewport dependent VR video encoding and decoding scheme, and retrieve segments of the media presentation. The file may, for example, include a plurality of tracks, with each respective track of the plurality of tracks containing a motion-constrained tile or tile region.

ISO/IEC 23008-2 video provides support for coding of rectangular regions called tiles. HEVC tiles do not have coding dependencies with other HEVC tiles in the same coded picture but may have coding dependencies with other HEVC tiles from previous coded pictures or may be independently decoded. In clause 10 of ISO/IEC 14496-15, a rectangular tile region is defined as any integer number of HEVC tiles forming a rectangular region encoded in one or more slices that contain no other HEVC tile and that may but need not be contiguous in decoding order. In clause 10 of ISO/IEC 14496-15, an unconstrained tile region is defined as any number of complete slices that consist of one or more complete HEVC tiles and may but need not be contiguous in decoding order. In clause 10 of ISO/IEC 14496-15, unconstrained tile regions can also be used to represent a region of interest spanning over several HEVC tiles.

Furthermore, as described in subclause 10.6 of ISO/IEC 14496-15,

There are cases where storing independently decodable HEVC (respectively L-HEVC) tiles in different tracks may be useful for fast spatial and temporal access to the video content. For such cases, tracks may be created using HEVCTileSampleEntry (respectively LHEVCTileSampleEntry) sample description format.

An HEVC (respectively L-HEHC) tile track is a video track for which there is a 'tbas' reference to the HEVC (respectively L-HEVC) track carrying NALUs of the associated HEVC layer to which the tile(s) belong. The sample description type for an HEVC tile track shall be 'hvt1'. The sample description type for an L-HEVC tile track shall be 'lht1'.

Neither the samples in the tile track or the sample description box shall contain VPS, SPS or PPS NAL units, these NAL units shall be in the samples or in the sample description box of the track containing the associated layer, as identified by the 'tbas' track reference. Both the HEVC/L-HEVC tile track and the track containing the associated layer, as indicated by the 'tbas' track reference, may use extractors, as defined in A.7, to indicate how the original bitstream is reconstructed; presence of extractors in these tracks may be constrained in some application domains.

An HEVC or L-HEVC sample stored in a tile track is a complete set of slices for one or more tiles, as defined in ISO/IEC 23008-2. Typically, if the track consists of a single HEVC tile, only the slice(s) used to code this tile will be found in the sample. A tile track typically includes one RectTileRegGroupEntry (single-tile track), or one UnconstrTileRegGroupEntry and one or more dependent RectTileRegGroupEntry this unconstrained tile region is made of (multi-tile track).

An HEVC sample stored in a tile track is considered as a sync sample if the VCL NAL units in the sample are Instantaneous Decoding Refresh (IDR) NAL units, Clean Random Access (CRA) NAL units, or Broken Link Access (BLA) NAL units.

An L-HEVC sample stored in a tile track is considered as a sync sample if the VCL NAL units in the sample are IRAP NAL units and the corresponding access unit has no RASL pictures.

Sub-sample and sample grouping defined for regular HEVC (respectively L-HEVC) samples have the same definitions for an HEVC (respectively L-HEVC) tile sample.

NOTE 1: An implementation may decide to decode only a subset of the complete tiles of an HEVC sequence. In this case, it may use the tile dependency information in the RectTileRegGroupEntry and UnconstrTileRegGroupEntry sample group descriptions to discard un-needed tracks or ignore some extractors while decoding the HEVC sequence.

NOTE 2: When only the part of the video represented by a particular HEVC or L-HEVC tile track is required, a file parser may use the following example process to generate the output bitstream to be fed to the video decoder: [Ed. (YK): This should be generalized for cases where a particular set of HEVC or L-HEVC tile tracks is required.]

Firstly the parameter sets and SEI NAL units contained in the sample entry are output, followed, in the order listed, by NAL units in the first sample firstSampleInBaseTrack in the base track (as indicated by the 'tbas' track reference) that must be present before VCL NAL units (e.g., parameter set NAL unit, prefix SEI NAL units), NAL units in firstSampleInBaseTrack's corresponding sample in the tile track, NAL units in firstSampleInBaseTrack that must be present after VLC NAL units (e.g., EOS NAL unit, EOB NAL unit), NAL units in the second sample secondSampleInBaseTrack in the base track that must be present before VLC NAL units, NAL units in secondSampleInBaseTrack's corresponding sample in the tile track, NAL unit in the secondSampleInBaseTrack that must be present after VLC NAL units, and so on.

Samples in the base track and the tile track are synchronized by decoding times. In other words, a sample in the base track and its corresponding sample in the tile track have the same decoding time.

When a motion-constrained tiles based viewport dependent VR video coding scheme is in use, and tile tracks as specified in clause 10 of 14496-15 are used, e.g., each motion-constrained tile or tile region is exclusively carried in a track or DASH representation, an adaptation-set-level element is used to signal the mapping between each motion-constrained tile or tile region and the representation carrying it. The element may contain an entry count, followed by a loop of values of {representation ID, region location, and region size}. When the same VR video is represented with multiple spatial resolutions (each spatial resolution would correspond to multiple tile tracks) and all the representations are included in one adaptation set, each region location and region size may be specified in relative to the highest resolution, or alternatively, in relative to the entire picture region of a particular resolution, where the particular resolution is indicated by an attribute that is equal to the representation ID that is associated with that particular resolution. A representation ID is said to be associated with the resolution that is the resolution of the pictures that are entirely or partially carried in the representation having that representation ID.

For example, a device, such as content preparation device 20, may sending an adaptation set level element of a media presentation that includes a mapping between a motion constrained tile or tile region and a representation carrying the motion constrained tile or tile region, and the device may send segments of the media presentation. A device, such as client device 40 or server device 60, may determine, based on an adaptation set level element of a media presentation, a mapping between a motion constrained tile or tile region and a representation carrying the motion constrained tile or tile region, and the device may retrieve segments of the media presentation. The adaptation set level element may include an entry count and a set of entries, with each entry in the set of entries including a representation identifier value, a region location value, and a region size value. The entry count may indicate the number of entries in the set of entries.

When a motion-constrained tiles based viewport dependent VR video coding scheme is in use, and tile tracks as specified in clause 10 of 14496-15 are not used, i.e., each track or DASH representation carries entire coded pictures, then access unit level or sample level byte ranges are needed for a DASH client to request a particular a motion-constrained tile or tile region, and the data referenced by byte range may be exclusively for a particular motion-constrained tile or tile region, or for all motion-constrained tile or tile regions. It would be too heavy for the MPD to include such byte ranges. One possibly viable way is to define a new box to contain such byte ranges, possibly in a relative manner, e.g., the 0th byte means the byte that immediately follows the new box, and an instance of such new box can be included in a segment index box, and the byte ranges of all samples or access units in the segment are documented in the new box.

For example, a device, such as content preparation device 20, may send, in a box in a file storing a media presentation that uses a motion-compensated tiles based viewport dependent VR video coding scheme, a byte range of a particular motion-constrained tile or tile region, and the device may send, based on the byte range of the particular motion-constrained tile or tile region, data of the particular motion-constrained tile or tile region. A device, such as client device 40 or server device 60, may determine, based on a box in a file storing a media presentation that uses a motion-compensated tiles based viewport dependent VR video coding scheme, a byte range of a particular motion-constrained tile or tile region, and the device may obtain, based on the byte range of the particular motion-constrained tile or tile region, data of the particular motion-constrained tile or tile region. The box may, for example, be a segment index box. The box may include data documenting byte ranges of all samples or access units in a segment of the media presentation.

Figure 7:
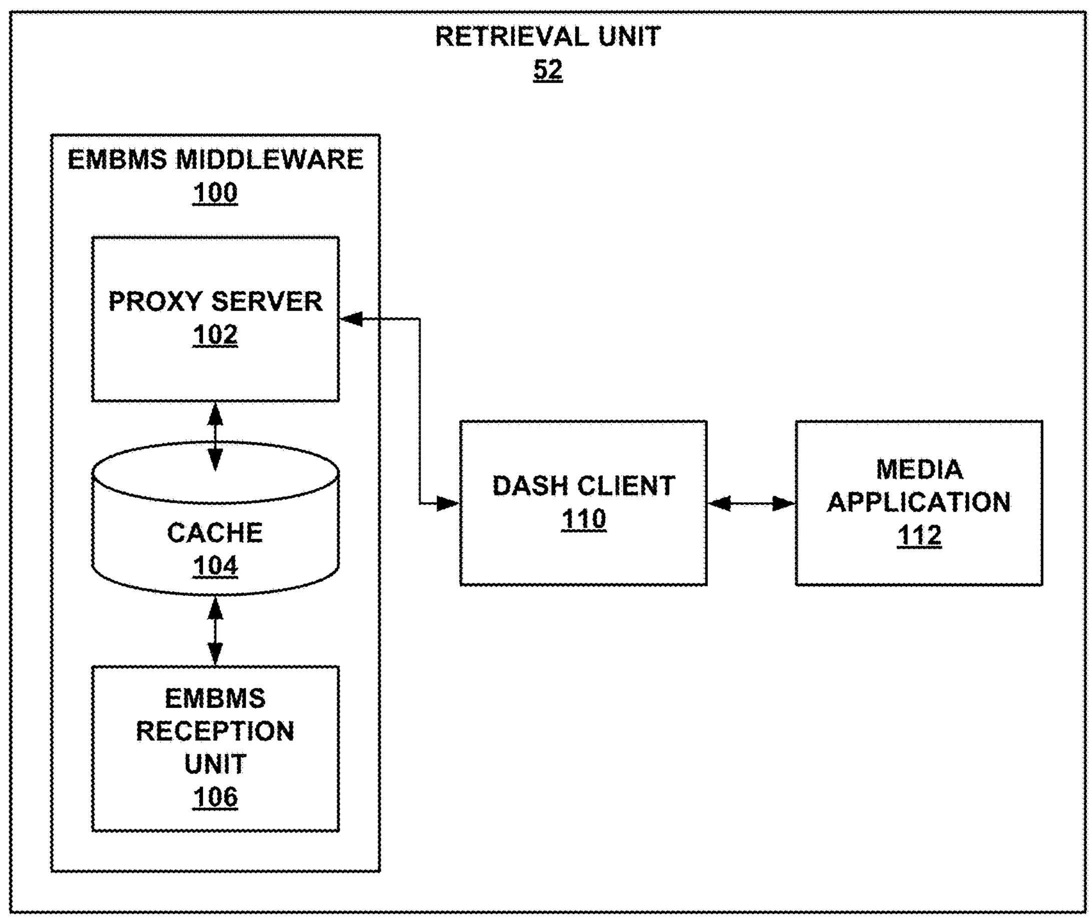
FIG. 7 is a block diagram illustrating an example set of components of a retrieval unit in greater detail.

FIG. 7 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

Figure 8:
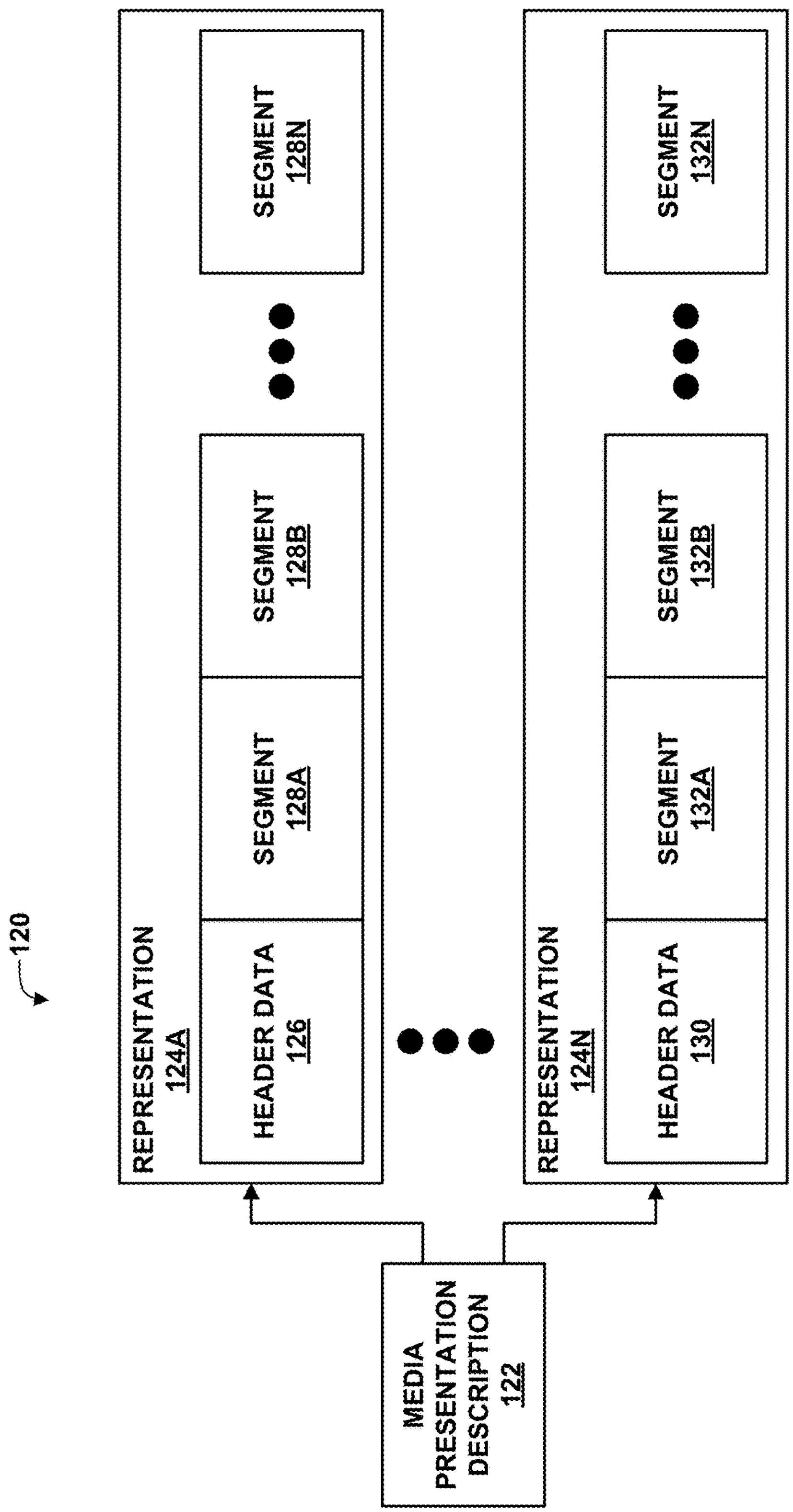
FIG. 8 is a conceptual diagram illustrating elements of example multimedia content.

FIG. 8 is a conceptual diagram illustrating elements of example multimedia content 120. Multimedia content 120 may correspond to multimedia content 64 (FIG. 1), or another multimedia content stored in storage medium 62. In the example of FIG. 8, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 8. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

FIG. 9 is a block diagram illustrating elements of an example video file 150, which may correspond to a segment of a representation, such as one of segments 128, 132 of FIG. 8. Each of segments 128, 132 may include data that conforms substantially to the arrangement of data illustrated in the example of FIG. 9. Video file 150 may be said to encapsulate a segment. As described above, video files in accordance with the ISO base media file format and extensions thereof store data in a series of objects, referred to as "boxes." In the example of FIG. 9, video file 150 includes file type (FTYP) box 152, movie (MOOV) box 154, segment index (sidx) boxes 162, movie fragment (MOOF) boxes 164, and movie fragment random access (MFRA) box 166. Although FIG. 9 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 9, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file

150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC and HEVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 9). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 10:
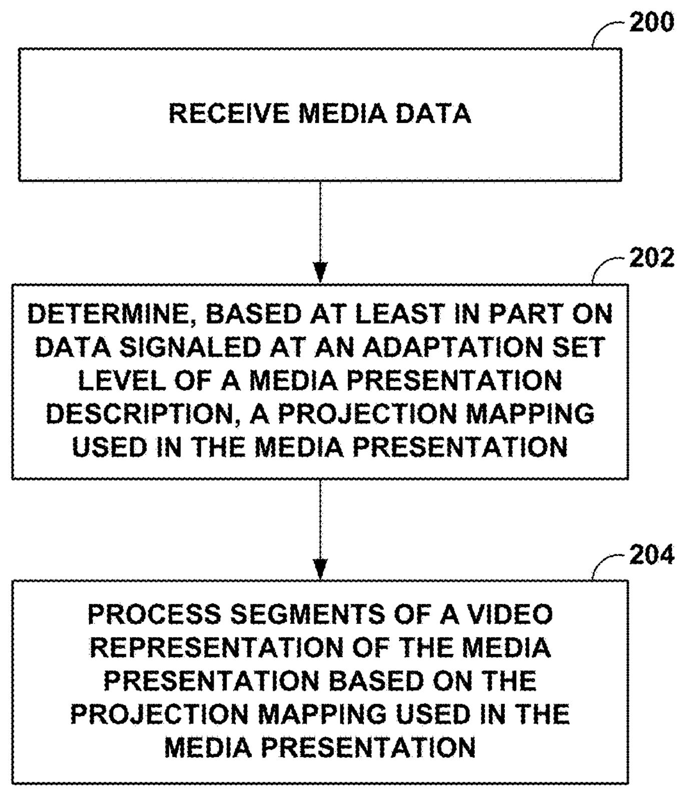
FIG. 10 is a flow chart for processing media data, according to techniques of this disclosure.

FIG. 10 is a flow chart for processing media data, according to techniques of this disclosure. The techniques of FIG. 10 will be described with respect to a generic device. The device may, for example, correspond to a server device such as server device 60, a client device such as client device 40, or some other type of device configured to process media data. The device receives the media data (200). The media data may include both VR video data and non-VR video data. The device determines, based at least in part on data signaled at an adaptation set level of a media presentation description for a media presentation, a projection mapping used in the media presentation (202). The data signaled at the adaptation set level may, for example, be an element in an adaption set, and the video representation may belong to the adaptation set.

The device processes segments of a video representation of the media presentation based on the projection mapping used in the media presentation (204). A server device may, for example, process the segments of the video representation of the media presentation based on the projection mapping used in the media presentation by determining, based at least in part on the projection mapping used in the media presentation, whether to retrieve the segments of the video representation. A server device may send the segments of the video representation of the media presentation to a client device. A client device may, for example, process the segments of the video representation of the media presentation based on the projection mapping used in the media presentation b determining, based at least in part on the projection mapping used in the media presentation, how to decode the segments of the video representation. A client device may, for example, decode the segments of the video representation of the media presentation based on the projection mapping used in the media presentation and output the decoded segments of the video representation of the media presentation.

In some implementations, adaptation level signalling may be optional, depending on the presence of period level signaling. In some examples, the device may also determine whether an indication of the projection mapping used in the media presentation is present at a period level of the media presentation, and determine the projection mapping used in the media presentation in response to determining that the indication of the projection mapping used in the media presentation is not present at the period level of the media presentation. In other examples, the device may also determine whether an indication of the projection mapping used in the media presentation is present at a period level of the media presentation, and determine the projection mapping used in the media presentation in response to determining that the indication of the projection mapping used in the media presentation is not present at the period level of the media presentation.

The device may also determine, based at least in part on data signaled at a period level of a second media presentation, and without additional signaling at a representation level of the second media presentation, a projection mapping used in the second media presentation and process segments of a video representation of the second media presentation based on the projection mapping used in the second media presentation.

Figure 11:
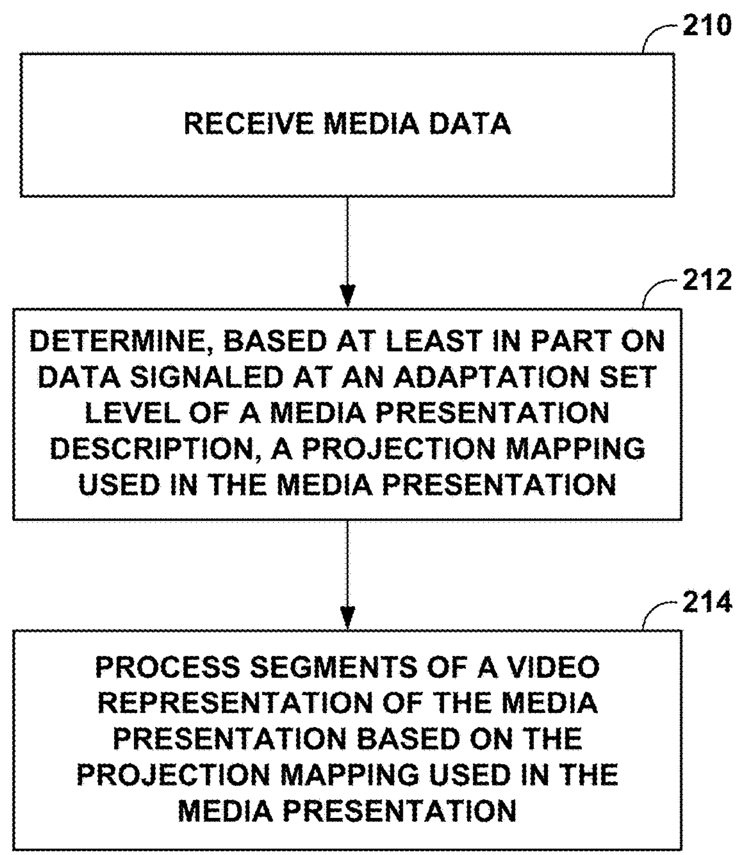
FIG. 11 is a flow chart for processing media data, according to techniques of this disclosure.

FIG. 11 is a flow chart for processing media data, according to techniques of this disclosure. The techniques of FIG. 11 will be described with respect to a generic device. The device may, for example, correspond to content preparation device such as content preparation device 20 or some other type of device configured to send media data. The device generates media data (210). The media data may, for example, include both VR video data and non-VR video data. The device includes in the media data, data signaled at an adaptation set level of a media presentation description that identifies a projection mapping used in the media presentation (212). The data signaled at the adaptation set level may, for example, be an element in an adaption set, and the video representation may belong to the adaptation set. The device sends segments of a video representation of the media presentation based on the projection mapping used in the media presentation (214).

In some implementations, adaptation level signalling may be optional, depending on the presence of period level signaling. In some examples, the device may also determine whether to include an indication of the projection mapping used in the media presentation at a period level of the media presentation, and include the data signaled at the adaptation set level of a media presentation description that identifies the projection mapping used in the media presentation in response to determining not to include the indication of the projection mapping used in the media presentation at the period level of the media presentation. In other examples, the device may also determine whether to include an indication of the projection mapping used in the media presentation at a period level of the media presentation, and include the data signaled at the adaptation set level of a media presentation description that identifies the projection mapping used in the media presentation in response to determining to include the indication of the projection mapping used in the media presentation at the period level of the media presentation.

The device may also include in the media data, data signaled at a period level of a second media presentation that identifies a projection mapping used in the second media presentation and sending segments of a video representation of the second media presentation based on the projection mapping used in the second media presentation.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising:

receiving the media data, wherein the media data comprises a media presentation, the media presentation comprises a video representation from an adaptation set comprising a set of video representations, the video representations comprises segments, and at least one of the segments comprise virtual reality (VR) video data;

determining, based at least in part on data signaled at an adaptation set level of a media presentation description data structure for the media presentation, a projection mapping used in the media presentation, wherein:

the data signaled at the adaption set level comprises an element in the media presentation description data structure;

the video representation belongs to the adaption set; and the element indicates one of: (a) all the segments contain VR video data, and the projection mapping represents to decode the segments as VR video data, or (b) there is at least one segment that contains VR video data and there is at least one segment that does not contain VR video data, and the projection mapping represents to decode the segment as either VR video data or non-VR video data;

processing the segments of the video representation of the media presentation based on the projection mapping used in the media presentation, wherein the processing further comprises using the projection mapping to determine:

whether to retrieve the segments of the video representation; and how to decode the segments of the video representation; and upon retrieving the segments of the video representation, outputting the processed segments to a device capable of consuming VR video data.

2. The method of claim 1, further comprising:

determining whether an indication of the projection mapping used in the media presentation is present at a period level of the media presentation, and wherein determining, based at least in part on the data signaled at the adaptation set level of a media presentation description data structure, the projection mapping used in the media presentation is performed in response to determining that the indication of the projection mapping used in the media presentation is not present at the period level of the media presentation.

3. The method of claim 1, further comprising:

determining whether an indication of the projection mapping used in the media presentation is present at a period level of the media presentation, and wherein determining, based at least in part on the data signaled at the adaptation set level of a media presentation description data structure, the projection mapping used in the media presentation is performed in response to determining that the indication of the projection mapping used in the media presentation is present at the period level of the media presentation.

4. The method of claim 1, further comprising:

determining, based at least in part on data signaled at a period level of a second media presentation, and without additional signaling at a representation level of the second media presentation, a projection mapping used in the second media presentation;

processing segments of a video representation of the second media presentation based on the projection mapping used in the second media presentation.

5. The method of claim 1, wherein:

processing the segments comprises decoding the segments of the video representation of the media presentation based on the projection mapping used in the media presentation; and outputting the processed segments comprises outputting the decoded segments of the video representation of the media presentation to a display device.

6. The method of claim 1, wherein outputting the processed segments comprises sending the segments of the video representation of the media presentation to a client device.

7. A device for processing media data, the device comprising: a memory configured to store the media data; and one or more processors configured to:

receive the media data, wherein the media data comprises a media presentation, the media presentation comprises a video representation, the video representation comprises segments, and at least one of the segments comprise virtual reality (VR) video data;

determine, based at least in part on data signaled at an adaptation set level of a media presentation description data structure for a media presentation, a projection mapping used in the media presentation, wherein:

the data signaled at the adaption set level comprises an element in the media presentation description data structure;

the video representation belongs to the adaption set; and the element indicates one of: (a) all the segments contain VR video data, and the projection mapping represents to decode the segments as VR video data, or (b) there is at least one segment that contains VR video data and there is at least one segment that does not contain VR video data, and the projection mapping represents to decode the segment as either VR video data or non-VR video data;

process the segments of the video representation of the media presentation based on the projection mapping used in the media presentation, wherein the processing further comprises using the projection mapping to determine:

whether to retrieve the segments of the video representation; and how to decode the segments of the video representation; and upon retrieving the segments of the video representation, output the processed segments to a device capable of consuming VR video data.

8. The device of claim 7, further comprising a receiver configured to receive the media data.

9. The device of claim 8, wherein the device comprises a wireless communication device and wherein the receiver is configured to demodulate, according to a wireless communication standard, a signal comprising the media data.

10. The device of claim 7, wherein the one or more processors are further configured to:

determine whether an indication of the projection mapping used in the media presentation is present at a period level of the media presentation, and wherein the one or more processors are configured to determine, based at least in part on the data signaled at the adaptation set level of a media presentation description data structure, the projection mapping used in the media presentation in response to determining that the indication of the projection mapping used in the media presentation is not present at the period level of the media presentation.

11. The device of claim 7, wherein the one or more processors are further configured to:

determine whether an indication of the projection mapping used in the media presentation is present at a period level of the media presentation, and wherein the one or more processors are configured to determine, based at least in part on the data signaled at the adaptation set level of a media presentation description data structure, the projection mapping used in the media presentation in response to determining that the indication of the projection mapping used in the media presentation is present at the period level of the media presentation.

12. The device of claim 7, wherein the one or more processors are further configured to:

determine, based at least in part on data signaled at a period level of a second media presentation, and without additional signaling at a representation level of the second media presentation, a projection mapping used in the second media presentation;

process segments of a video representation of the second media presentation based on the projection mapping used in the second media presentation.

13. The device of claim 7, wherein the one or more processors are further configured to:

decode the segments of the video representation of the media presentation based on the projection mapping used in the media presentation; and output the decoded segments of the video representation of the media presentation to a display device.

14. The device of claim 7, wherein the one or more processors are further configured to sending the segments of the video representation of the media presentation to a client device.

15. A method of processing media data, the method comprising: generating media data, wherein the media data comprises a media presentation, the media presentation comprises a video representation, the video representation comprises segments, and at least one of the segments comprise virtual reality (VR) video data;

including in the media data, data signaled at an adaptation set level of a media presentation description data structure that identifies a projection mapping used in the media presentation included in the media data, wherein:

the data signaled at the adaption set level comprises an element in the media presentation description data structure;

the video representation belongs to the adaption set; and the element indicates one of: (a) all the segments contain VR video data, and the projection mapping represents to decode the segments as VR video data, or (b) there is at least one segment that contains VR video data and there is at least one segment that does not contain VR video data, and the projection mapping represents to decode the segment as either VR video data or non-VR video data; and sending segments of a video representation of the media presentation based on the projection mapping used in the media presentation, wherein the projection mapping indicates to a receiving device whether to retrieve the segments of the video representation.

16. The method of claim 15, further comprising:

determining whether to include an indication of the projection mapping used in the media presentation at a period level of the media presentation, and wherein including in the media data, the data signaled at the adaptation set level of a media presentation description data structure that identifies the projection mapping used in the media presentation is performed in response to determining not to include the indication of the projection mapping used in the media presentation at the period level of the media presentation.

17. The method of claim 15, further comprising:

determining whether to include an indication of the projection mapping used in the media presentation at a period level of the media presentation, and wherein including in the media data, the data signaled at the adaptation set level of a media presentation description data structure that identifies the projection mapping used in the media presentation is performed in response to determining to include the indication of the projection mapping used in the media presentation at the period level of the media presentation.

18. The method of claim 15, further comprising:

including in the media data, data signaled at a period level of a second media presentation that identifies a projection mapping used in the second media presentation; and sending segments of a video representation of the second media presentation based on the projection mapping used in the second media presentation.

19. A device for processing media data, the device comprising: a memory configured to store the media data; and one or more processors configured to:

generate media data, wherein the media data includes comprises a media presentation, the media presentation comprises a video representation, the video representation comprises segments, and at least one of the segments comprise virtual reality (VR) video data;

include in the media data, data signaled at an adaptation set level of a media presentation description data structure that identifies a projection mapping used in the media presentation included in the media data, wherein:

the data signaled at the adaption set level comprises an element in the media presentation description data structure;

the video representation belongs to the adaption set; and the element indicates one of: (a) all the segments contain VR video data, and the projection mapping represents to decode the segments as VR video data, or (b) there is at least one segment that contains VR video data and there is at least one segment that does not contain VR video data, and the projection mapping represents to decode the segment as either VR video data or non-VR video data; and send the segments of the video representation of the media presentation based on the projection mapping used in the media presentation wherein the projection mapping indicates to a receiving device whether to retrieve the segments of the video representation.

20. The device of claim 19, wherein the one or more processors are further configured to:

determine whether to include an indication of the projection mapping used in the media presentation at a period level of the media presentation, and wherein the one or more processors are configured to include in the media data, the data signaled at the adaptation set level of a media presentation description data structure that identifies the projection mapping used in the media presentation in response to determining not to include the indication of the projection mapping used in the media presentation at the period level of the media presentation.

21. The device of claim 19, wherein the one or more processors are further configured to:

determine whether to include an indication of the projection mapping used in the media presentation at a period level of the media presentation, and wherein the one or more processors are configured to include in the media data, the data signaled at the adaptation set level of a media presentation description data structure that identifies the projection mapping used in the media presentation in response to determining to include the indication of the projection mapping used in the media presentation at the period level of the media presentation.

22. The device of claim 19, wherein the device comprises a wireless communication device comprising a transmitter, wherein the transmitter is configured to modulate, according to a wireless communication standard, a signal comprising the media data.

* * * * *